US00RE35303E

United States Patent [19]

Miller et al.

[11] E Patent Number: Re. 35,303

[45] Reissued Date of Patent: Jul. 30, 1996

[54] APPARATUS FOR ADJUSTABLY CONTROLLING VALVE MOVEMENT AND FUEL INJECTION

[75] Inventors: Charles R. Miller, Metamora; Tsu P. Shyu, Dunlap; J. Roger Weber, Chillicothe, all of Ill.

[73] Assignee: Caterpillar Inc., Peoria, Ill.

[21] Appl. No.: 317,042

[22] Filed: Oct. 3, 1994

Related U.S. Patent Documents

Reissue of:

[64] Patent No.: 5,237,968
Issued: Aug. 24, 1993
Appl. No.: 971,103
Filed: Nov. 4, 1992

[51] Int. Cl.[6] ..... F01L 9/02; F02M 37/04

[52] U.S. Cl. ..... 123/90.11; 123/90.12; 123/498; 123/508

[58] Field of Search ..... 123/90.11, 90.12, 123/90.13, 90.14, 90.15, 507, 508, 498

[56] References Cited

U.S. PATENT DOCUMENTS

| | | | |
|---|---|---|---|
| 4,009,695 | 3/1977 | Ule | 123/90.12 |
| 4,020,803 | 5/1977 | Thuren et al. | 123/90.11 |
| 4,602,604 | 7/1986 | Kauer | 123/508 |
| 4,699,103 | 10/1987 | Tsukahara et al. | 123/498 |
| 5,057,734 | 10/1991 | Tsuzuki et al. | 123/498 |
| 5,203,830 | 4/1993 | Faletti et al. | 123/90.11 |
| 5,216,987 | 6/1993 | Clarke | 123/90.11 |
| 5,255,650 | 10/1993 | Faletti et al. | 123/90.11 |
| 5,271,229 | 12/1993 | Clarke et al. | 123/90.11 |

FOREIGN PATENT DOCUMENTS

| | | | |
|---|---|---|---|
| 204962 | 11/1983 | Japan | 123/508 |
| 2107393 | 4/1983 | United Kingdom | 123/90.12 |
| 2405 | 4/1986 | WIPO | 123/90.12 |

*Primary Examiner*—Weilun Lo
*Attorney, Agent, or Firm*—Joseph W. Keen

[57] ABSTRACT

An apparatus adjustably controls intake and exhaust valve movement and fuel injection of an engine. Valve movement and injection is adjustably controlled in response to electrical signals delivered to a piezoelectric motor which in turn delivers hydraulic signals through a single spool valve.

16 Claims, 4 Drawing Sheets

APPARATUS FOR ADJUSTABLY CONTROLLING VALVE MOVEMENT AND FUEL INJECTION

Matter enclosed in heavy brackets [ ] appears in the original patent but forms no part of this reissue specification; matter printed in italics indicates the additions made by reissue.

TECHNICAL FIELD

This invention relates generally to an apparatus for adjustably controlling valve movement and fuel injection of an engine. More specifically, this invention relates to means for adjustably controlling valve movement and fuel injection of an engine in response to electrical signals.

BACKGROUND ART

A conventional internal combustion engine uses either a cam and push rod system or a direct acting overhead cam operating on a rocker-arm to actuate the engine poppet valves. The camshaft typically runs the length of the engine and is driven by a gear train off of the crankshaft. The engine valve timing events are fixed with respect to the crankshaft position and the lift rate of the valve is proportional to engine speed. These restrictions upon the engine valves induce compromises in engine performance regarding fuel consumption, emissions, torque, and idle quality. To minimize these compromises, numerous methods have been introduced to vary the phasing of the intake and exhaust valve cams relative to crankshaft position. The variable valve actuation mechanisms are inherently costly and complex.

The diesel engine camshaft with direct fuel injection typically has a cam to drive the injector plunger. The fuel injector cam [lob] *lobe* is especially prone to durability problems with high pressure fuel injection systems. In another type system, as taught in U.S Pat. No. 4,009,695 which issued on Mar. 1, 1977 to Louis A. Ule, the valves are operated by two separate valve assemblies which are moved in response to a mechanical apparatus which is controlled by engine speed.

The subject invention combines direct high pressure fuel injection with intake and exhaust valve actuation in a single hydraulically powered device. The subject invention replaces the camshaft and conventional valve train components thereby reducing the engine part count and maintenance. The subject invention has the ability to electronically adjust valve and fuel injection timing which provides a freedom to optimize engine performance at any engine load or speed. The subject invention allows a modular approach to engine design which would be difficult to accomplish with a mechanical valve train system.

DISCLOSURE OF THE INVENTION

In one aspect of the present invention, there is provided an apparatus for adjustably controlling valve movement and fuel injection of an engine. The engine has at least one fuel injection system, at least one exhaust valve system, at least one intake valve system, a microprocessor controller for receiving input signals and delivering engine controlling electrical signals, and a liquid pressure system.

A single piezoelectric motor is connectable to the microprocessor controller and the liquid pressure system. The piezoelectric motor is adapted to receive engine controlling electrical signals from the microprocessor and controllably deliver pressurized liquid signals to the liquid pressure system in response to the received signals.

A spool valve has a single spool and a plurality of inlets and outlets. The spool valve is connectable to the liquid pressure system for receiving pressurized liquid signals therefrom and controllably moving the single spool of the spool valve. The spool valve delivers liquid valve and injection controlling signals to the valve system and injector system and controls both valve movement and fuel injection responsive to engine controlling electrical signals received by the piezoelectric motor.

BEST MODE FOR CARRYING OUT THE INVENTION

Figure 1:
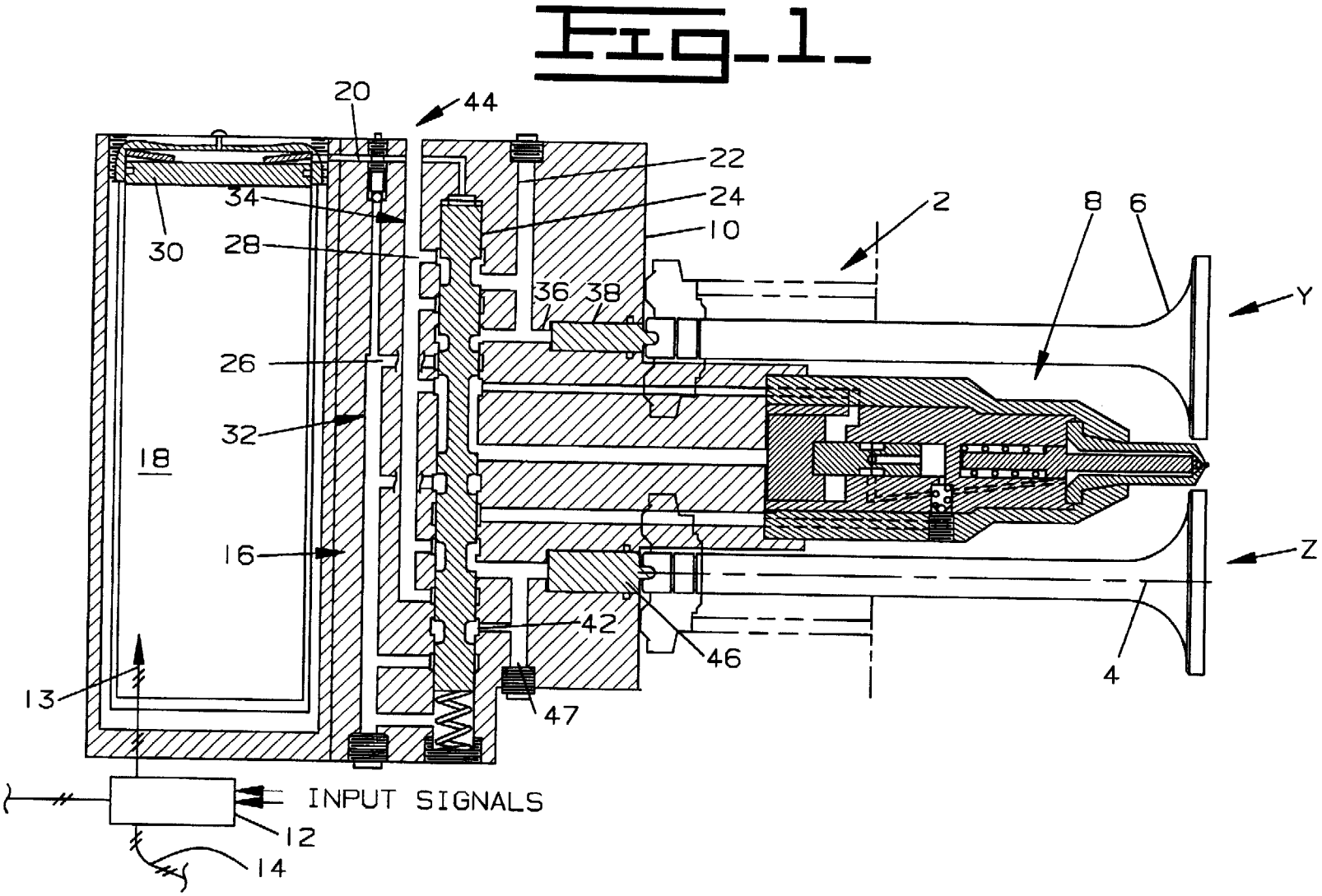
FIG. 1 is a diagrammatic view of the apparatus of this invention.
Figure 2:
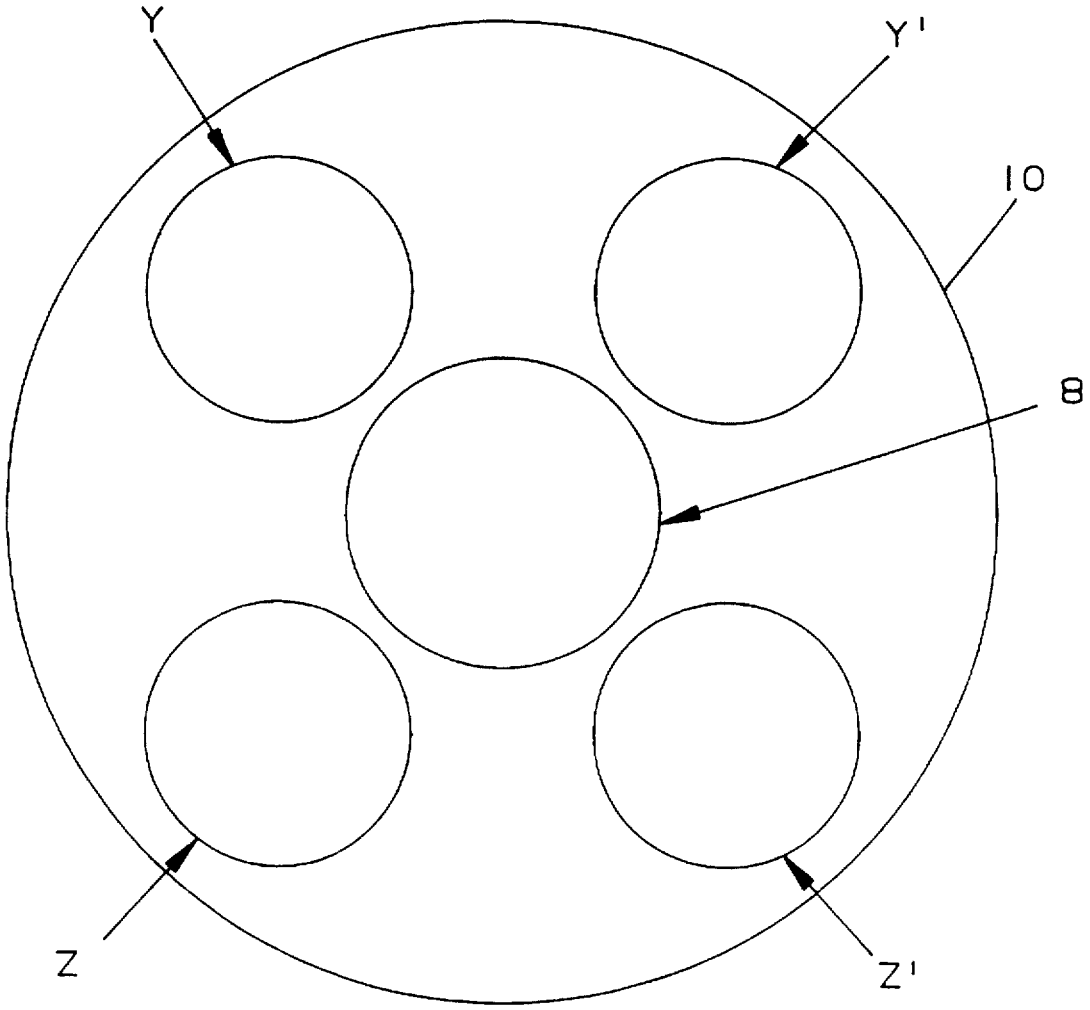
FIG. 2 is a diagrammatic view of another embodiment of the apparatus of this invention.

Referring to FIGS. 1 and 2, the apparatus 2 of this invention is used for adjustably controlling movement of the intake valves 4 [,4'] *or Z,Z'*, the exhaust valves 6 [,6'] *or Y,Y'* and controlling fuel injection of an engine (not shown). FIG. 1 shows one intake valve 4, one exhaust valve 6 and one fuel injection system 8. FIG. 2 shows an embodiment wherein each cylinder 10 of the engine is associated with two intake valves [4,4'] *Z,Z'*, two exhaust valves [6,6'] *or Y,Y'* and one fuel injection system 8.

A microprocessor controller 12, as is well known in the art, is provided for receiving input signals and delivering engine controlling electrical signals via line 14. The apparatus 2 has a liquid pressure system 16 [as further shown in FIG. 3].

As better seen in FIG. 1, a single piezoelectric motor 18 is connectable to the microprocessor controller 12 and the liquid pressure system 16. The piezoelectric motor 18 is adapted to receive controlling electrical signals via line 13 from the microprocessor 12 and controllably deliver pressurized liquid signals via line 20 to the liquid pressure system 16 in response to said received signals.

The liquid pressure system 16 has a spool valve 22 which has a single spool 24. The valve 22 has a plurality of inlets 26 and outlets 28 and is connectable to the liquid pressure system 16 for receiving pressurized liquid signals therefrom and controllably moving the single spool 24 of the spool valve 22 which in turn delivers valve and injection controlling signals to the valve systems, which include the intake valve 4 and exhaust valve 6 and to the fuel injection system 8. Thereby, the apparatus of this invention controls both valve movement and fuel injection responsive to engine controlling electrical signals received by the piezoelectric motor 18.

The piezoelectric motor i8 is well known in the art and includes an amplifier piston 30 which is adapted to increase, to a preselected magnitude, the pressure of the pressurized liquid signals delivered from the piezoelectric motor 18. Preferably, the amplifier piston increases the liquid pressure signals to a ratio magnitude in the range of about 5:1 to about 9:1, more preferably to a ratio of about 7:1. Ratio magnitudes greater than about 9:1 are undesirable because the large diameter required of the piezoelectric motor, and ratio magnitudes less than about 5:1 are undesirable because of the long length required of the piezoelectric motor. As is known in the art, component sizes are limiting factors because of crowded engine compartment conditions.

The single spool 24 of the spool valve 22 is spring biased to a first position and is movable in response to receiving the pressurized liquid signals from the piezoelectric motor 18. Preferably, the spool 24 of the spool valve 22 is biased by a Bellville spring, as is well known in the art.

In order to provide a simple, yet effective system, it is preferred that the liquid of the liquid pressure system 16 and the liquid controlling signals is diesel fuel. Hence, the injection system 8 and the valves 4,6 are powered and controllably moved during operation of the engine by hydraulics with the pressurized liquid for controlling passing from the spool valve 22.

As is known in the art and shown schematically in FIG. 2, an engine generally has a plurality of cylinders 10 [,10'] each having at least one fuel injection system [(X)] *8*, at least one exhaust valve system (Y), and at least one intake valve system (z). As is further known in the art, the engines generally have a multiplicity of cylinders 10 and associated apparatus as described above, however, for simplicity, only [two cylinders] *one cylinder* 10 [,10'] and associated apparatus are shown with primed numbers representing similar or identical apparatus.

The engine having the plurality of cylinders 10 and associated apparatus are each connected to a respective separate piezoelectric motor 18 and a respective spool valve 22 with each of said piezoelectric motors and spool valves being connectable to the common liquid pressure system 16. The plurality of piezoelectric motors are connected to and receive engine controlling electrical signals from a single microprocessor.

In the preferred embodiment, as better seen in FIG. 1 *and 3 in conjunction*, the *common* liquid pressure system 16 [is] *includes* a rail system, as is known in the art. One rail 32 is of high pressure and the other rail 34 is of low pressure. The high pressure rail 32 is preferably maintained at a pressure in the range of about 2000 to about 4000 psia/psig, more preferably at about 3000 psia/psig and the low pressure rail 34 is preferably maintained at a pressure in the range of about 100 to about 300 psia/psig, more preferably at about 200 psia/psig.

Pressures of high pressure rail 32 which are greater than about 5000 psig are undesirable because the high pressure pump would represent waste and because it would be hard to maintain structural integrity of the system, and pressures of the high pressure rail 32 which are less than about 2000 *psia/psig* are undesirable because the injector intensifier piston would have to be of a very large diameter in order to obtain the proper amplifier ratio.

[Pressure] *Pressures* of the low pressure rail 34 which are greater than about 400 *psia/psig* are undesirable because of excessive valve spring preload requirement to offset the low pressure acting on the plunger driving the valve, and pressures of the low pressure rail 34 which are less than about 14.7 psia are undesirable because there would be cavitation in the passages connecting the spool valve to the engine valves.

Figure 3:
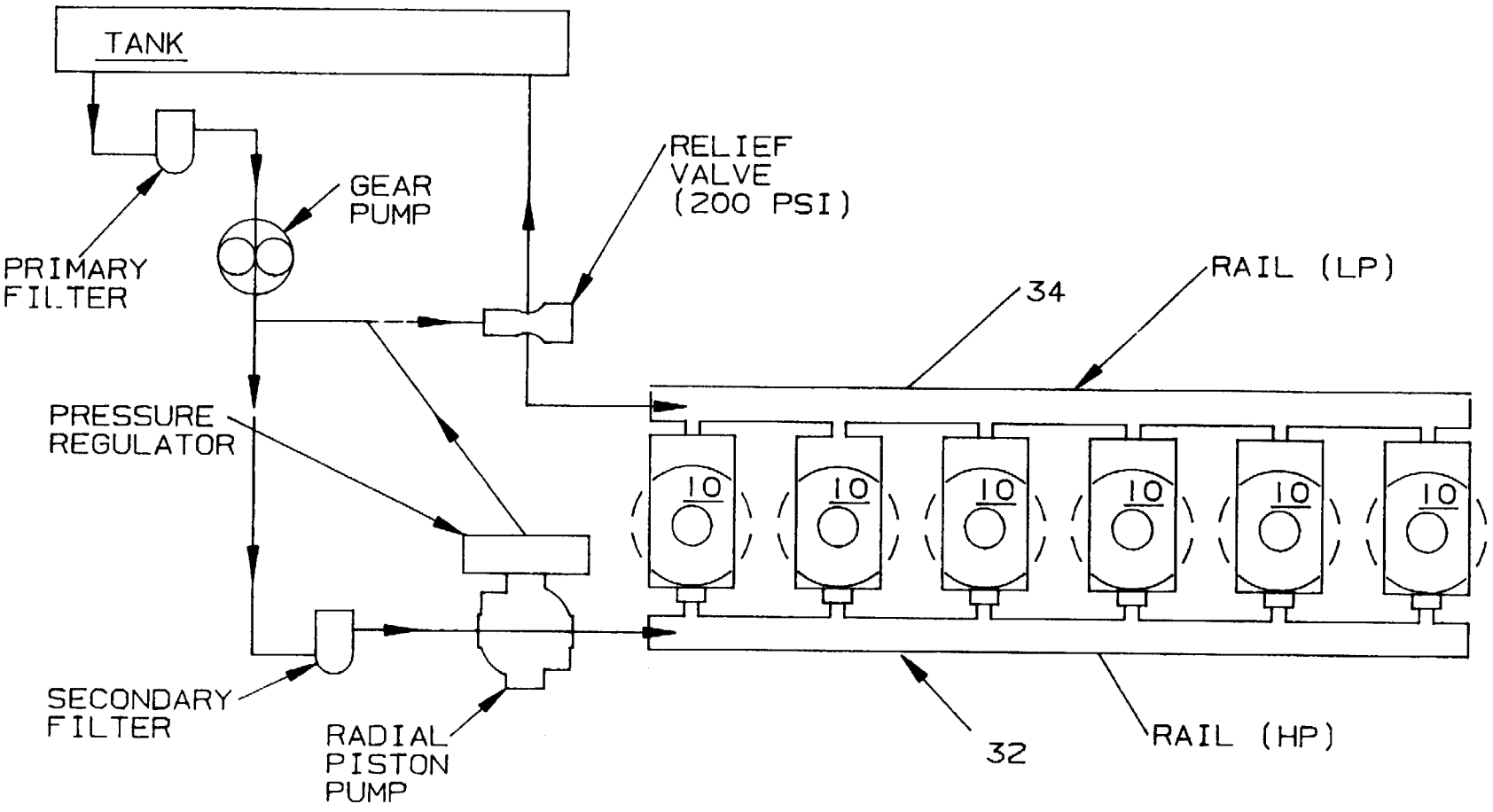
FIG. 3 is a diagrammatic view of apparatus associated with the apparatus of this invention.

FIG. 3, shows a schematic of associated apparatus of this invention. The associated equipment is well known in the art and the elements are identified and associated with multiple cylinders [10a–10f] *10* of an engine.

For simplicity, a written description of the well known equipment and obvious liquid flow paths will not be described in detail as one skilled in the art can easily construct this associated equipment without inventive effort. However, it is preferred that the low pressure pump serving the low pressure rail 34 is a common gear pump and the high pressure pump serving the high pressure rail 32 is a radial type pump.

As is further known in the art, one skilled in hydraulics and spool valves can readily position the grooves and associated inlets and outlets of the spool valve to achieve the desired results.

Industrial Applicability

As stated above, one skilled in the hydraulic and/or valve art can design the valve, the spool and various passageways after the preferred timing is known. An example spool movement table is as follows:

| STROKE (mm) | VOLTAGE | EXHAUST VALVE | INTAKE VALVE | INJECTOR |
|---|---|---|---|---|
| 0.5 | 300 | LP closed | LP open | LP open |
| 1.0 | 600 | HP open, valve actuated. | LP open | LP open |
| 1.5 | 900 | HP closed, LP ready to open. | LP open | LP open |
| 2.0 | 1200 | LP open | LP closed, HP ready to open. | LP open |
| 2.5 | 1500 | LP open | HP open, valve actuated. | LP open |
| 3.0 | 1800 | LP open | actuation completed; HP closed. | LP open |
| 3.75 | 2250 | LP open | LP open | Start metering |
| 4.32 | 2600 | LP open | LP open | HP open; Start inj. |
| 5.0 | 3000 | LP open | LP open | Injection completed |

Figure 4:
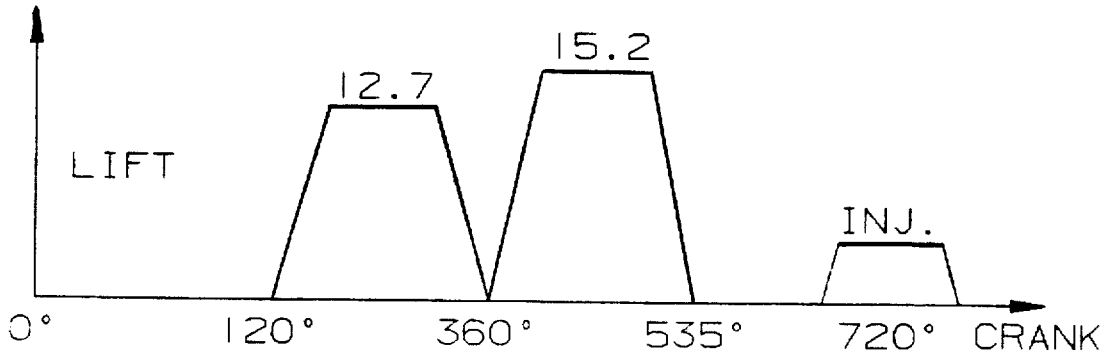
FIG. 4 is a graph of crankangles vs. lift.

Relation to crank angle is as set forth in FIG. 4.

Therefore, when the piezoelectric motor 18 starts to energize at a low voltage, 300 v. for example, the piezo stack expands 0.025 mm and moves the spool 24 from rest position [1a to position 2a] through a 20:1 amplification or area ratio between the piezo disks and the spool 24. At this position, the exhaust valve low pressure line 28 is ready to close and the high pressure line 26 is ready to open.

By increasing the voltage to 600 v. for example, the spool moves to 1 mm position. The exhaust low pressure is fully closed and the high pressure is open. That actuates the exhaust valve 6 and the exhaust plunger 38 for as long as the timing event is required.

By switching from high pressure to low pressure, reducing voltage from 600 v back to 300 v, and allowing the valve momentum to complete the valve opening cycle, hydraulic power consumption is reduced. [This is an effective method of power recuperation.]

By increasing the voltage to 900 v, the spool [location 1b] moves [to position 2b] and closes the HP line [21] *26* and at the same time opens low pressure line [28'] *28*. The exhaust valve spring (not shown) shuts the exhaust valve 6 and completes the exhaust valve actuation. The same [recuperation] *power reduction* scheme applies here during the valve closing. The reduction in power consumption is even more effective in closing than in opening. Further, the closing [recuperation] *power reduction* will assist in reducing valve seating velocity.

By increasing the voltage to 1200 v, the spool [location 1g] moves to *a* position [2g. The] *whereby the* intake valve low pressure line [28"] *28* is ready to close and the high pressure [26"] *line 26* is ready to open.

Further, increasing the voltage to 1500 v fully closes the intake valve low pressure line and the high pressure line is wide open and communicates with the passages 42 and 47, thereby actuating the intake valve 4 through the intake plunger 46. The same [recuperation] *power reduction* technique employed for the exhaust valve can be applied for the intake valve 4.

When the voltage increases to 1800 v the spool moves [from] *to a* position [1i to 2i. The] *whereby the* passage 42 will be shut off and the high pressure line [26"] *26* will be closed. The low pressure line [28"] *28* will be open. The intake valve spring will shut the intake valve 4 and complete the intake valve actuation.

Other aspects, objects and advantages of this invention can be obtained from a study of the drawings, the disclosure and the appended claims.

We claim:

1. Apparatus for adjustably controlling valve movement and fuel injection of an engine having at least one fuel injection system, one exhaust valve system, one intake valve system, a microprocessor controller for receiving input signals and delivering engine controlling electrical signals, and a liquid pressure system, comprising:

a single [piezoelectric motor] *electric motor means* connectable to the microprocessor controller and the liquid pressure system and being adapted to receive engine controlling electrical signals from the microprocessor and controllably delivering pressurized liquid signals to the liquid pressure system in response to said received signal; and a spool valve having a single spool, said *spool* valve having a plurality of inlets and outlets and being connectable to the liquid pressure system for receiving *said* pressurized liquid signals therefrom and controllably moving the single spool of the spool valve , and *said spool valve* delivering *exhaust and intake* valve *system* and *fuel* injection *system* controlling signals to the *exhaust and intake* valve systems and [injector] *the fuel injection* system, and *said spool valve* controlling both [valve] movement *of the exhaust and intake valve systems* and fuel injection *system* responsive to engine controlling electrical signals received by said [piezoelectric motor] *electric motor means*.

2. An apparatus, as set forth in claim 1, wherein the [piezoelectric motor] *electric motor means* includes an amplifier piston adapted to increase, to a preselected magnitude, the pressure of the pressurized liquid signals delivered from the [piezoelectric] *electric* motor *means*.

3. An apparatus, as set forth in claim 2, wherein the amplifier piston increases the liquid pressure signals to a ratio magnitude in the range of about 5:1 to about 9:1.

4. An apparatus, as set forth in claim 3, wherein the ratio magnitude is about 7:1.

5. An apparatus, as set forth in claim 1, wherein the spool of the spool valve is spring biased to a first position and movable in response to receiving the pressurized liquid signal.

6. An apparatus, as set forth in claim 5, including a Bellville spring and wherein the spool of the spool valve is biased by said Bellville spring.

7. An apparatus, as set forth in claim 1, wherein the liquid of the liquid pressure system and liquid controlling [systems] *signals* is diesel fuel.

8. An apparatus, as set forth in claim 1, wherein the injection system and the valve systems are powered by pressurized liquid from the spool valve.

9. An apparatus, as set forth in claim 1, wherein the engine has a plurality of cylinders each having at least one fuel injection system, at least one exhaust valve system [and], at least one intake valve system [connected to], a respective [piezoelectric motor] *electric motor means* and a respective spool valve, each of said [piezoelectric motors] *electric motor means* and spool valves being connectable to a common liquid pressure system.

10. An apparatus, as set forth in claim 9, wherein the plurality of [piezoelectric motors] *electric motor means* are connected to and receive controlling electrical signals from a single microprocessor.

11. An apparatus, as set forth in claim 1, wherein the liquid pressure system is a rail system.

12. An apparatus, as set forth in claim 11, wherein the liquid pressure rail system has a high pressure rail and a low pressure rail.

13. an apparatus, as set forth in claim 12, wherein the high pressure rail is maintained at a pressure in the range of about 2000 to about 4000 psia/psig.

14. An apparatus, as set forth in claim 13, wherein the high pressure rail is maintained at a pressure of about 3000 psia/psig.

15. An apparatus, as set forth in claim 12, wherein the low pressure rail is maintained at a pressure in the range of about 100 to about 300 psia/psig.

16. An apparatus, as set forth in claim 15, wherein the low pressure rail is maintained at a pressure of about 200 psia/psig.

* * * * *